US012478292B2

(12) United States Patent
Page et al.

(10) Patent No.: US 12,478,292 B2
(45) Date of Patent: Nov. 25, 2025

(54) DEVICES, SYSTEMS, AND METHODS OF MONITORING ARTERIAL CARBON DIOXIDE

(71) Applicant: THE RESEARCH FOUNDATION FOR THE STATE UNIVERSITY OF NEW YORK, Albany, NY (US)

(72) Inventors: Christopher Page, Rye Brook, NY (US); Yosman Dhar, Jericho, NY (US)

(73) Assignee: THE RESEARCH FOUNDATION FOR THE STATE UNIVERSITY OF NEW YORK, Albany, NY (US)

(*) Notice: Subject to any disclaimer, the term of this patent is extended or adjusted under 35 U.S.C. 154(b) by 560 days.

(21) Appl. No.: 17/081,098

(22) Filed: Oct. 27, 2020

(65) Prior Publication Data

US 2021/0121107 A1    Apr. 29, 2021

Related U.S. Application Data

(60) Provisional application No. 62/926,587, filed on Oct. 28, 2019.

(51) Int. Cl.
*A61B 5/145* (2006.01)
*A61B 5/00* (2006.01)
*A61B 5/08* (2006.01)

(52) U.S. Cl.
CPC ............ *A61B 5/14542* (2013.01); *A61B 5/08* (2013.01); *A61B 5/6817* (2013.01); *A61B 5/742* (2013.01); *A61B 5/746* (2013.01); *A61B 5/7475* (2013.01); *A61B 2562/0247* (2013.01)

(58) Field of Classification Search
CPC ..... A61B 5/14542; A61B 5/08; A61B 5/0836; A61B 5/6815–6817; A61B 5/742; A61B 5/746; A61B 5/7475; A61B 2562/0247
See application file for complete search history.

(56) References Cited

U.S. PATENT DOCUMENTS

| | | | |
|---|---|---|---|
| 4,274,418 A | * | 6/1981 | Vesterager ......... A61B 5/14542 204/415 |
| 4,324,256 A | | 4/1982 | Vesterager |
| 4,832,034 A | | 5/1989 | Pizziconi et al. |
| 5,251,619 A | | 10/1993 | Lee |

(Continued)

FOREIGN PATENT DOCUMENTS

| | | | |
|---|---|---|---|
| CA | 3210898 A1 | | 2/2016 |
| CN | 103037934 | * | 4/2013 |

(Continued)

OTHER PUBLICATIONS

Machine Translation of CN 103037934, Patent Translate, pp. 1-15, printed on Jun. 30, 2025 (Year: 2013).*

(Continued)

*Primary Examiner* — Jennifer Robertson
*Assistant Examiner* — Om Patel
(74) *Attorney, Agent, or Firm* — Scully, Scott, Murphy & Presser, P.C.

(57) ABSTRACT

Disclosed are devices and systems for monitoring and measuring arterial carbon dioxide, including those with an occlusive earpiece, a housing and a carbon dioxide sensor. A pressure sensor may also be provided. The devices and methods can monitor for altered carbon dioxide production and ventilator impairment and provide alerts.

23 Claims, 5 Drawing Sheets

(56) References Cited

U.S. PATENT DOCUMENTS

| | | | |
|---|---|---|---|
| 5,533,512 | A | 7/1996 | Novotny et al. |
| 5,617,850 | A | 4/1997 | Pontzer |
| 5,743,259 | A | 4/1998 | Kruse et al. |
| 6,013,007 | A * | 1/2000 | Root .................. A63B 69/0028 482/902 |
| 6,053,172 | A | 4/2000 | Hovda et al. |
| 6,247,470 | B1 | 6/2001 | Ketchedjian |
| 6,454,718 | B1 | 9/2002 | Clift |
| 6,556,852 | B1 | 4/2003 | Schulze et al. |
| 7,769,420 | B2 | 8/2010 | Silver et al. |
| 8,204,786 | B2 | 6/2012 | LeBoeuf et al. |
| 8,583,229 | B2 | 11/2013 | Rezai et al. |
| 8,700,111 | B2 | 4/2014 | LeBoeuf et al. |
| 9,510,780 | B2 | 12/2016 | Silver |
| 9,579,060 | B1 | 2/2017 | Lisy et al. |
| 10,064,697 | B2 | 9/2018 | Sharma et al. |
| 10,241,105 | B2 | 3/2019 | Kwak et al. |
| 10,709,388 | B2 | 7/2020 | Goldstein |
| 11,850,087 | B2 | 12/2023 | Shute et al. |
| 2008/0146890 | A1* | 6/2008 | LeBoeuf ................ A61B 7/003 600/300 |
| 2010/0057046 | A1 | 3/2010 | Stevens (Nee Webber) et al. |
| 2010/0192952 | A1 | 8/2010 | Melker et al. |
| 2013/0218022 | A1* | 8/2013 | Larsen ..................... A61B 5/01 600/474 |
| 2015/0005591 | A1 | 1/2015 | Davis |
| 2015/0138556 | A1 | 5/2015 | LeBoeuf et al. |
| 2015/0257925 | A1 | 9/2015 | Schwartz |
| 2016/0324478 | A1 | 11/2016 | Goldstein |
| 2017/0064460 | A1 | 3/2017 | Hviid et al. |
| 2017/0112671 | A1 | 4/2017 | Goldstein |
| 2017/0135633 | A1* | 5/2017 | Connor .............. A61N 1/36557 |
| 2017/0360339 | A1 | 12/2017 | Gisiger |
| 2018/0242859 | A1* | 8/2018 | LeBoeuf .............. A61B 5/7207 |
| 2019/0076100 | A1* | 3/2019 | Narkiss ................. A61M 16/06 |
| 2019/0228631 | A1 | 7/2019 | Stinson et al. |
| 2019/0343480 | A1* | 11/2019 | Shute .................. A61B 5/7203 |
| 2020/0016373 | A1 | 1/2020 | Hulvershorn et al. |
| 2022/0061767 | A1 | 3/2022 | Goldstein et al. |
| 2022/0096318 | A1 | 3/2022 | Harper et al. |
| 2022/0347474 | A1 | 11/2022 | Brown |

FOREIGN PATENT DOCUMENTS

| | | | |
|---|---|---|---|
| DE | 69820494 T2 | 6/2004 | |
| DE | 102017104268 A1 | 9/2017 | |
| EP | 3171768 A1 | 5/2017 | |
| JP | H09507128 A | 7/1997 | |
| JP | 2000121467 A | 4/2000 | |
| JP | 2007525253 A | 9/2007 | |
| JP | 2011229615 A | 11/2011 | |
| JP | 2013502269 A | 1/2013 | |
| JP | 2018531124 A | 10/2018 | |
| JP | 2018531124 A6 | 12/2018 | |
| JP | 2019527119 A | 9/2019 | |
| JP | 2020193219 A | 12/2020 | |
| JP | 7132905 B2 | 9/2022 | |
| KR | 20170035919 A | 3/2017 | |
| TW | 201422204 A | 6/2014 | |
| TW | 201517884 A | 5/2015 | |
| WO | WO-9823205 A1 * | 6/1998 | ............. A61B 1/227 |
| WO | 1999023941 A1 | 5/1999 | |
| WO | 2010027957 A2 | 3/2010 | |
| WO | 2014021335 A1 | 2/2014 | |
| WO | 2014177944 A2 | 11/2014 | |
| WO | WO 2017/014981 A1 | 1/2017 | |
| WO | WO-2017207957 A1 * | 12/2017 | ......... A61B 5/14551 |

OTHER PUBLICATIONS

The Severinghause PCO2 Electrode: A Theoretical and Experimental Assessment Lunn et al Nov. 1963, retrieved Dec. 28, 2020 https://www.bjanaesthesia.org.uk/article/S0007-0912(17)430.

International Search Report and Written Opinion mailed Jan. 27, 2021 in related International Application No. PCT/US20/57454.

Dive right into this buyer guide on the best waterproof headphones, downloaded Jun. 2019 https://www.headphonesty.com/2019/09/best-waterproof-headphones-swimming/#Sony_NWWS413LM.

Tympanometry Machines, downloaded Jun. 2019 https://www.e3diagnostics.com/products/tympanometry---middle-ear-analyzers.

Doyle et al. Transmucosal O2 and CO2 Exchange Rates for the Human Middle Ear, Auris Nasus Larynx, Dec. 2011.

Yuksel et al. CO2 Gas Exchange Across the Human Tympanic Membrane is not Appreciably Affected by Pathology, Eur Arch Otorhinolaryngol, Feb. 2011.

Ikarashi et al. Carbon Dioxide Exhange via the Mucosa in Healthy Middle Ear, American Medical Association, 1999.

Ikarashi , The effect of respiratory mode on human middle ear pressure, Auris Nasus Larynx, 1998.

Alper, Trans-Middle-Ear Mucosal Gas Exchange Project 1, Specific Aim 1, Aug. 19, 2013.

Yuksel et al. In Vivo Measurement of O2 and CO2 Gas Exchange Across the Human Tympanic Membrane, Acta Otolaryngol, Jul. 2009.

Felding et al. Gas diffusion across the tympanic membrane in chinchillas: effect of repeated perforations, Auris Nasus Larynx, 2004.

Tschupp et al. A Combined Ear Sensor for Pulse Oximetry and Carbon Dioxide Tension Monitoring: Accuracy in Critically Ill Children, Anesth Analg 2003.

EarCheck Middle Ear Monitor, downloaded Jun. 2019 http://www.unitedhealthsupply.com/EarCheck-Middle-Ear-Monitor-earcheck-Middle-ear-Monitor-1-EACH_p_47622.html.

Hearing aids: How to choose the right one, downloaded Jun. 2019 https://www.mayoclinic.org/diseases-conditions/hearing-loss/in-depth/hearing-aids/art-20044116.

European Search Report dated Oct. 5, 2023 received in a corresponding foreign patent application, 8 pages.

Severinghaus, J.W., CO2 Electrodes, Encyclopedia of Medical Devices and Instrumentation, 2006, pp. 109-120.

Leboeuf, S. F., et al., U.S. Appl. No. 60/905,761, filed Mar. 8, 2007, "Telemetric earpiece module & network for health & environmental monitoring", 65 pages.

Restrepo, R. D. et al., "AARC Clinical Practice Guideline: Transcutaneous Monitoring of Carbon Dioxide and Oxygen: 2012", 2012, pp. 1955-1962, 57 Respir. Care.

Bernet-Buettiker, V. et al., "Evaluation of a new combined transcutaneous measurement of PCO2/pulse oximetry oxygen saturation ear sensor in newborn patients", 2005, e64-8, 115 Pediatrics.

Radiometer CO2 Sensor Specs, 2020, pp. 1-3, Radiometer Medical, TCM CombiM and tc Sensor 54 (tcpCO2) Sensor Specifications.

Staab, W., "The Human Ear Canal Length and Dimensions", Jul. 7, 2023, 13 pages, accessed online at https://hearinghealthmatters.org/waynesworld/2023/humanear-canal-v/ Apr. 2, 2024), Hearing Health and Technology Matters.

Tucker, J. B., et al., U.S. Appl. No. 60/876,128, filed Dec. 21, 2006, "Earpiece environment monitor", 19 pages.

Leboeuf, S. F., et al., U.S. Appl. No. 60/875,606, filed Dec. 19, 2006, "Wireless earpiece health monitor", 17 pages.

* cited by examiner

DEVICES, SYSTEMS, AND METHODS OF MONITORING ARTERIAL CARBON DIOXIDE

CROSS-REFERENCE TO RELATED APPLICATION

This application is a non-provisional of and claims priority to U.S. Patent Application Ser. No. 62/926,587, filed Oct. 28, 2019, which is hereby incorporated by reference in its entirety.

FIELD

The present disclosure relates to carbon dioxide monitoring devices, systems and methods.

BACKGROUND

The measurement of arterial carbon dioxide (CO2) via non-invasive means is essential in many medical environments and conditions. One potential application involves opioids, which impair breathing by suppressing the excitability of neurons in the body. This may result in opioid induced ventilatory impairment (OVI), an iatrogenic and preventable problem that can cause severe complications and death.

The best method of monitoring patients in these situations is human observation, followed by pulse oximetry. However, these methods are inadequate as The Anesthesia Patient Safety Foundation, biotech companies like Medtronic, and movements such as Leah's Legacy, continue to highlight the significance of OVI. Most attempts at alleviating this issue focus on raising awareness and changing protocols, not technology.

Most monitoring devices surveil oxygen diffusion and respiration, leading to inaccuracies and patient endangerment, due to artifacts, delayed measurements, and variations based on physiology. Pulse oximetry is the most common method of monitoring. However, despite being inexpensive and widely available, it is an extremely late indicator of inadequate ventilation. Other methods based on carbon dioxide monitoring such as capnography and plethysmography are expensive, potentially invasive, and still have inaccuracies related to the methods by which parameters are measured.

Therefore, there exists a need for a better technological method of monitoring arterial carbon dioxide levels. There is a need for a more accurate solution for directly measuring arterial carbon dioxide. There is also a need for a non-invasive device that measures arterial carbon dioxide.

SUMMARY

The present disclosure, in its many embodiments, alleviates to a great extent the disadvantages of known carbon dioxide monitoring systems by providing devices and systems that measure carbon dioxide levels non-invasively by quantifying gas diffusion through the tympanic membrane and surrounding structures via a space that is hermetically sealed from the environment within the external auditory canal. The disclosed devices, systems and methods advantageously provide an accurate reflection of arterial carbon dioxide levels, which is the most relevant physiologic parameter to determine adequacy of ventilation in a non-invasive manner. Exemplary devices and systems would provide real-time accurate measurements, while providing information in a manner that is familiar to healthcare providers.

Disclosed devices represent an improvement over current monitoring techniques for measurement of arterial carbon dioxide, as they target and corrects the key issues of difficulty in non-invasively measuring arterial CO2, (environmental dilution of expired gases, inefficient transcutaneous diffusion, invasive blood sampling or movement artifact) and delayed recognition of impaired breathing, while also increasing the accuracy of recognition, unbiased by physiological or biological differences. Compared to other means of monitoring, exemplary devices would be small and contained, would not require any invasive procedures, and could be used to monitor for many types of ventilatory impairment or altered carbon dioxide production.

Exemplary embodiments of an arterial carbon dioxide monitoring device comprise an earpiece, a housing and a carbon dioxide sensor located within the housing. The earpiece is configured to provide a hermetic seal enclosing a patient's external auditory canal, and the hermetic seal creates equilibration between airspace contained in the external auditory canal and the arterial blood vessels. The carbon dioxide sensor measures arterial carbon dioxide levels in arterial blood vessels of a patient's tympanic membrane and external auditory canal.

In exemplary embodiments, the carbon dioxide sensor measures arterial carbon dioxide levels by measuring changes in carbon dioxide diffusion from the arterial blood vessels of the tympanic membrane and external auditory canal. The carbon dioxide sensor may be configured to quantify gas diffusion through the tympanic membrane and external auditory canal. In exemplary embodiments, the carbon dioxide sensor monitors for altered carbon dioxide production and ventilatory impairment. The device may further comprise an alert system providing alerts in the event of altered carbon dioxide production or ventilatory impairment. In exemplary embodiments, a pressure sensor is located within the housing to monitor pressure differences in a patient's ear.

Exemplary embodiments include additional features. For example, a user display including one or more buttons may be provided. The device may further comprise a lock-unlock feature to prevent accidental pressing of the one or more buttons. In exemplary embodiments, the housing further contains one more of a microprocessor, microcontroller, alert system, battery, or pressure sensor. The device may further comprise a stability hook coupled to the earpiece to allow the device to be stably attached to a patient's ear. The earpiece may contain a tube to aid in measuring arterial carbon dioxide levels.

An exemplary system for measuring arterial carbon dioxide levels comprises an occlusive earpiece and a carbon dioxide sensor. The occlusive earpiece has a proximal end and a distal end and is configured to provide a hermetic seal enclosing a patient's external auditory canal. The hermetic seal creates equilibration between airspace contained in the external auditory canal and the arterial blood vessels. The carbon dioxide sensor measures arterial carbon dioxide levels in arterial blood vessels of a patient's tympanic membrane and external auditory canal. The system may further comprise a stability hook coupled to the occlusive earpiece to allow it to be stably attached to a patient's ear.

In exemplary embodiments, the occlusive earpiece defines a tube running therethrough, and the carbon dioxide sensor is flush against the tube. The carbon dioxide sensor may be located at or near the proximal end of the occlusive earpiece or at or near the distal end of the occlusive earpiece. In exemplary embodiments, the occlusive earpiece has a diffusible membrane that allows diffusion of carbon dioxide into the tube. The carbon dioxide sensor may measure arterial carbon dioxide levels by measuring changes in carbon dioxide diffusion from the arterial blood vessels of the tympanic membrane and external auditory canal. In exemplary embodiments, the carbon dioxide sensor quantifies gas diffusion through the tympanic membrane and external auditory canal. The carbon dioxide sensor may monitor for altered carbon dioxide production and ventilatory impairment. In exemplary embodiments, an alert system provides alerts in the event of altered carbon dioxide production or ventilatory impairment.

Accordingly, it is seen arterial carbon dioxide monitoring devices and measuring systems are provided which non-invasively measure carbon dioxide levels directly and accurately. These and other features of the present invention will be appreciated from review of the following detailed description of the invention, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects. Reference to temperature, pressure, density and other parameters should be considered as representative and illustrative of the capabilities of exemplary embodiments, and embodiments can operate with a wide variety of such parameters. It should be noted that the figures do not show every piece of equipment, nor the pressures, temperatures and flow rates of the various streams.

FIGS. 1 and 4-7 illustrate exemplary embodiments of an arterial carbon dioxide monitoring device 10, 110, 210, 310, 410. As discussed in detail herein, the device 10, 110, 210, 310, 410 measures carbon dioxide diffusion, which varies with overall minute ventilation to determine respiratory adequacy of the patient. Disclosed devices and systems have a broad set of applications whenever monitoring of arterial carbon dioxide level or ventilation is required. As there is a dearth of effective devices monitoring ventilation accurately, disclosed devices and systems would be used to provide novel accurate monitoring when breathing may be compromised or in undergoing other conditions that may alter arterial carbon dioxide levels. In a medical setting this includes monitoring around the perioperative setting, overdoses, intubation, ambulatory care, nursing homes, and potentially as a common addition to prosaic monitoring.

Figure 1:
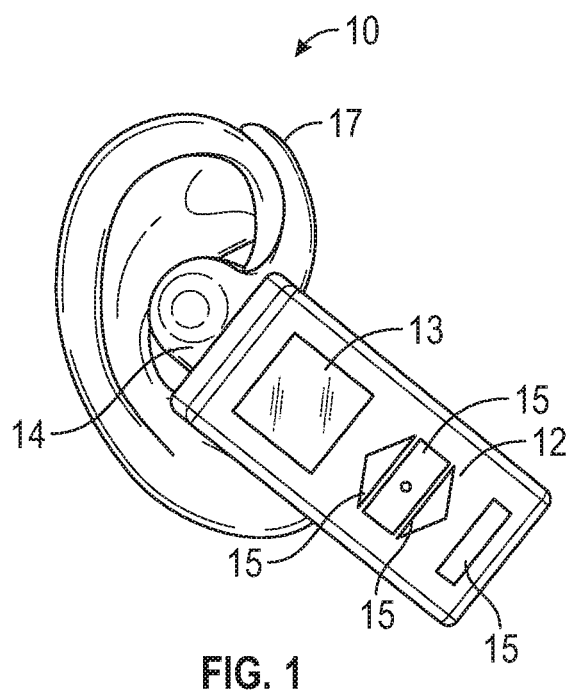
FIG. 1 is a perspective view of an exemplary embodiment of an arterial carbon dioxide monitoring device in accordance with the present disclosure.

With reference to FIG. 1, device 10 has a housing 12 and serves as a monitoring module that primarily measures carbon dioxide and pressure differences in the ear. An occlusive earpiece 14 is coupled to the housing 12. The earpiece 14 and/or the housing 12 may be configured to provide a hermetic seal enclosing the patient's auditory canal. More particularly, the housing 12 and/or earpiece 14 are made from a diffusion resistant, yet comfortable, material that provides the hermetic seal that encloses the area of the external auditory canal. Exemplary earpieces are made of a moldable material that conforms to the size and shape of the ear canal, thus providing a hermetic seal. The material does not allow significant diffusion of carbon dioxide or ambient air. The earpiece could be expandable or inflatable to help with providing the seal.

In exemplary embodiments, all components of the device 10 are positioned to minimize dead space and gas volume within this enclosed space. This leads to more rapid equilibration between the contained airspace and arterial blood vessels passing through the anatomic area. The sealing of this area allows for equilibration of arterial carbon dioxide without contamination or dilution by environmental gases. In addition, by having this area sealed from the external environment this allows for accurately detecting changes in pressure within this space which may also reflect and correlate with changes in arterial CO2 levels.

Figure 2A:
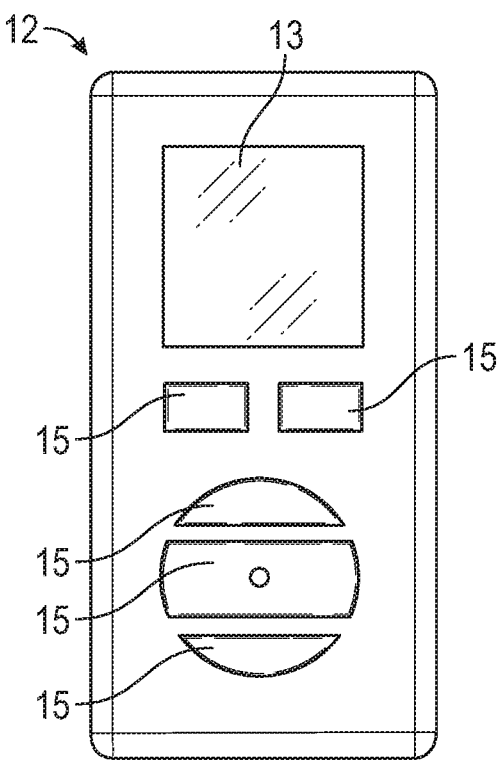
FIG. 2A is a front view of an exemplary embodiment of a housing in accordance with the present disclosure.
Figure 2B:
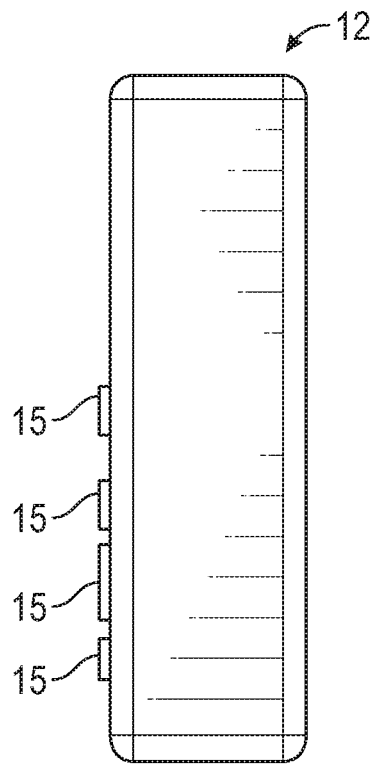
FIG. 2B is a side view of the housing of FIG. 2A.

An exemplary housing 12 is shown in FIGS. 2A-2B. Housing 12 may include an LCD screen 13 or other form of display for configuration, data display, settings, and more, as well as buttons 15 to access various features and provide easy navigation of the LCD screen. Exemplary embodiments may also contain a lock-unlock feature to prevent accidental, unintended pressing of buttons 15 that may alter configurations during movement. The electronics, sensors, and display may vary in location and function, and additional electronics and display methods could also be provided to ensure accurate monitoring and data.

Figure 3:
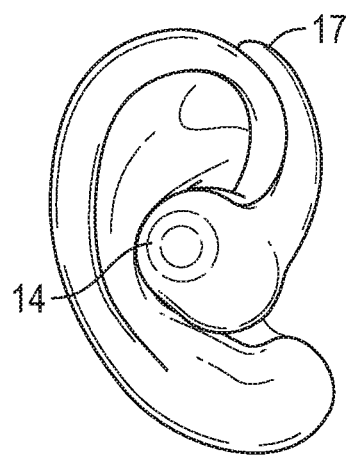
FIG. 3 is a perspective view of an exemplary embodiment of a stability hook in accordance with the present disclosure.

As best seen in FIGS. 1 and 3, fettered to the housing 12 may be stability hook 17 to wrap around the ear, thereby helping place the monitoring device 10, 110, 210, 310, 410 on the ear while maintaining stability. Other external stability methods could be used instead of stability hooks if needed. In exemplary embodiments, there may be an external earpiece attached to the housing made from a moldable and disposable material for a tight seal around the ear entrance. As discussed in more detail herein, the earpiece 14 may contain a tube that will aid in measurements of pressure, carbon dioxide diffusion, and other potential means. Additional disposable components could be provided, and the device could vary in shape and size. More particularly, the housing, earpiece, and supporting components may vary in shape, size, function, and material.

Exemplary devices and systems include a carbon dioxide sensor 16 to measure arterial carbon dioxide levels in arterial blood vessels of a patient's tympanic membrane and external auditory canal. More particularly, the CO2 sensor 16 measures changes in carbon dioxide diffusion from the arterial blood vessels of the tympanic membrane 19 and external auditory canal and provides quantitative information based on equilibration with arterial carbon dioxide concentration. One potential method may utilize a calibration period to develop an average that serves as a baseline for future measurements and aids in indicating deviations in carbon dioxide level. The device could include additional sensors and detect additional articles to aid in accurate monitoring. This data would either supplement the primary measurements or be displayed separately.

Turning to FIGS. 4-7, configurations with the carbon dioxide sensor 16 in various locations will now be described. As mentioned above, the carbon dioxide sensor 16 and other sealing elements could be located in the housing 12. In exemplary embodiments, the CO2 sensor 16 is located within the housing 12 along with other components, including but not limited to, a microprocessor or microcontroller (not shown), an alert system 26, and a pressure sensor 21, as well as a rechargeable battery that may require an external cable or may remain unplugged during movement.

Figure 4:
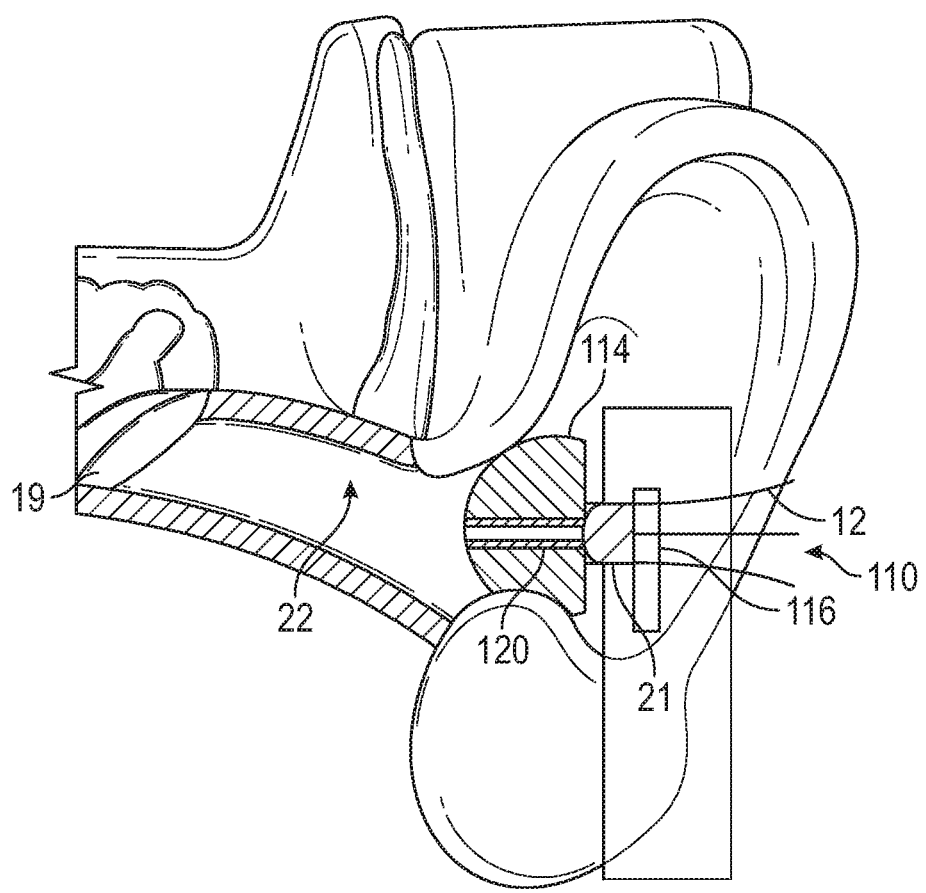
FIG. 4 is a detail view of an exemplary embodiment of a device and system for measuring arterial carbon dioxide levels in accordance with the present disclosure.

FIG. 4 illustrates an exemplary embodiment of an arterial carbon dioxide device and system 110 in which an occlusive earpiece 114 is made of a material that allows diffusion of carbon dioxide into a sealed tube or chamber 120 with a CO2 sensor 116 measuring CO2 concentration within the chamber. In this embodiment, the carbon dioxide sensor 116 is located at a proximal end of the earpiece 114, and earpiece 114 contains a tube 120 running through it. This sealed tube 120 has an entry point in the auditory canal 22 and extends from the distal end of earpiece 114 to the CO2 sensor 116. The moldable earpiece 114 conforms to the size of the ear canal, thereby creating a closed environment and a hermetic seal of the external auditory canal with the tube 120. This allows for carbon dioxide to quickly equilibrate in the sealed tube 120. The CO2 sensor is flush against the tube 120 for quick and accurate measuring of any concentration changes. A pressure sensor 21 may be located near the carbon dioxide sensor.

Figure 5:
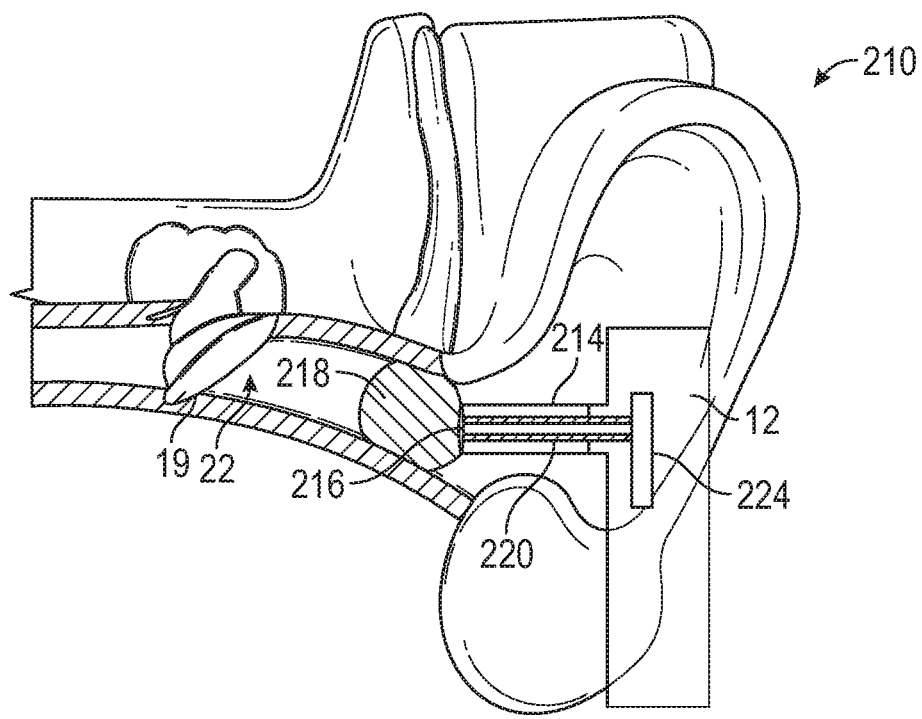
FIG. 5 is a detail view of an exemplary embodiment of a device and system for measuring arterial carbon dioxide levels in accordance with the present disclosure.

In exemplary measuring systems 210 and 310, the carbon dioxide sensor is located near the sealed environment to reduce dead space and artifacts. As best seen in FIG. 5, a diffusible membrane 218 partially inserted into the auditory canal contains carbon dioxide sensor 216. This configuration reduces dead space. An occlusive earpiece 214 has a channel or tube 220 that allows passage of the diffusion chamber into the distal portion of ear canal, and the CO2 sensor is in the diffusion chamber. The diffusible membrane 218 makes a hermetic seal of the external auditory canal 22 with the CO2 sensor 216 in the diffusible membrane 218. The earpiece 214 contains a tube 220 running through it. The sealed tube 220 may contain electrical connections, such as wiring, running between the CO2 sensor 216 and the housing 212. The tube 220 extends from the diffusible membrane 218 into the housing 212 and may connect to the system processor 224.

Figure 6:
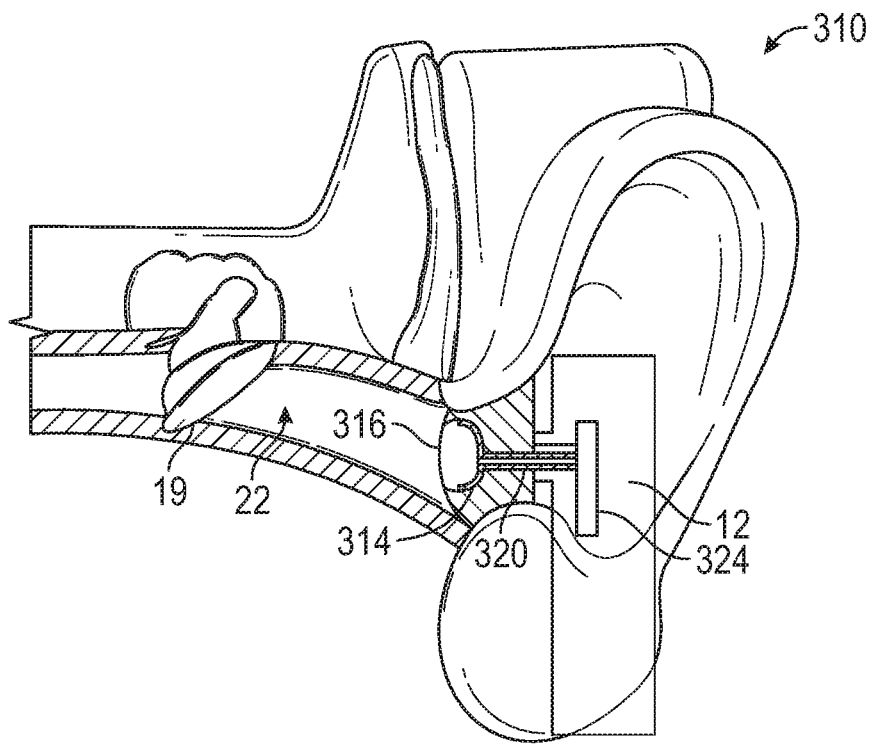
FIG. 6 is a detail view of an exemplary embodiment of a device and system for measuring arterial carbon dioxide levels in accordance with the present disclosure.

In an exemplary embodiment shown in FIG. 6, the carbon dioxide sensor 316 is located in the occlusive earpiece 314 and positioned so it is directly exposed to the closed environment of the auditory canal 22. The occlusive earpiece 314 makes a hermetic seal of the external auditory canal 22 with the CO2 sensor 316 at the distal end of the earpiece 314. A tube 320 runs through occlusive earpiece 314 and contains electrical connections, such as wiring, running between the CO2 sensor 216 and the housing 212 and connecting the CO2 sensor to the system processor 324.

Figure 7:
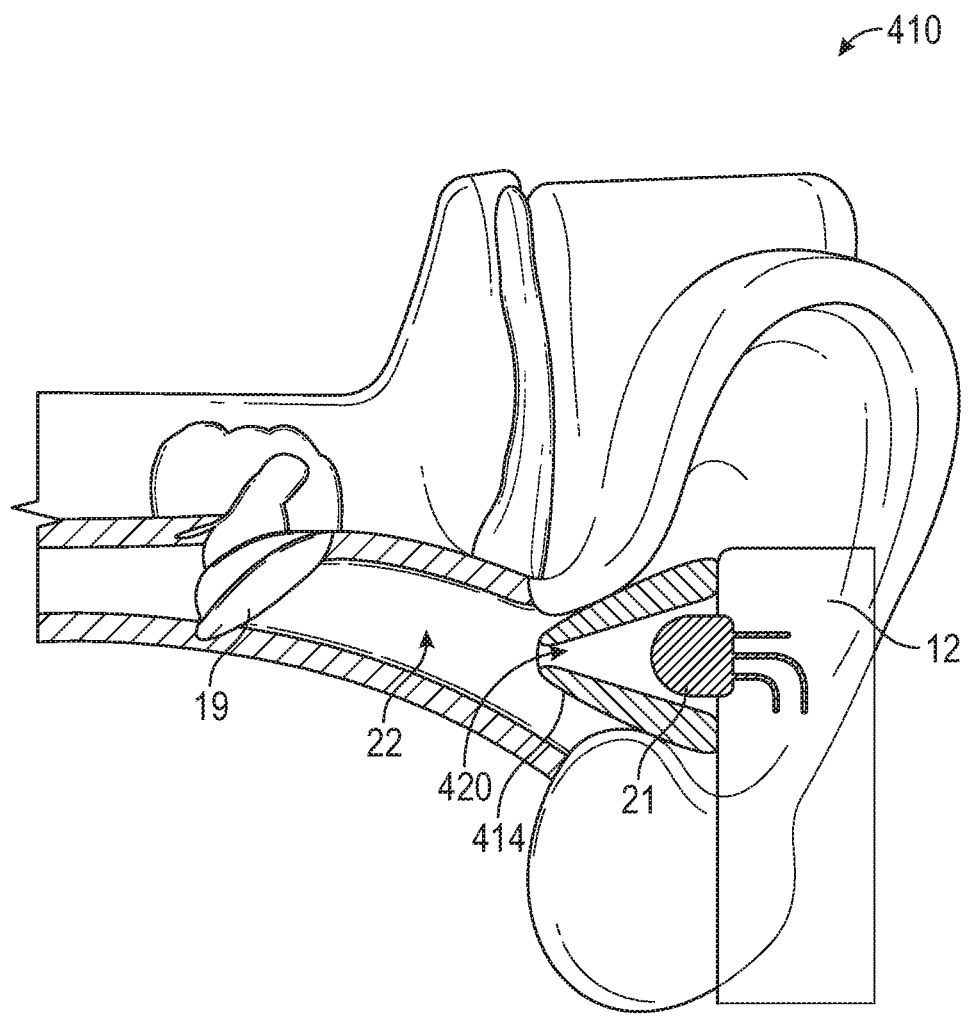
FIG. 7 is a detail view of an exemplary embodiment of a device and system for measuring arterial carbon dioxide levels in accordance with the present disclosure.

In exemplary embodiments, the device and system uses a pressure sensor 21. The pressure sensor 21 may mimic the design of a tympanometry probe and be located near the carbon dioxide sensor. As shown in FIG. 4, pressure sensor 21 could be provided in conjunction with other measuring systems such as the carbon dioxide sensor. In exemplary embodiments, pressure sensor 21 can be used exclusively, as illustrated in FIG. 7. Carbon dioxide monitoring system 410 includes occlusive earpiece 414 and housing 12, with the pressure sensor 21 located within the tube 420 of the earpiece. The pressure sensor could be located near the sealed environment to reduce dead space and artifacts, in the earpiece, the tube, or within the housing of the device, and is used to measure pressure changes in the external auditory canal.

Figure 8:
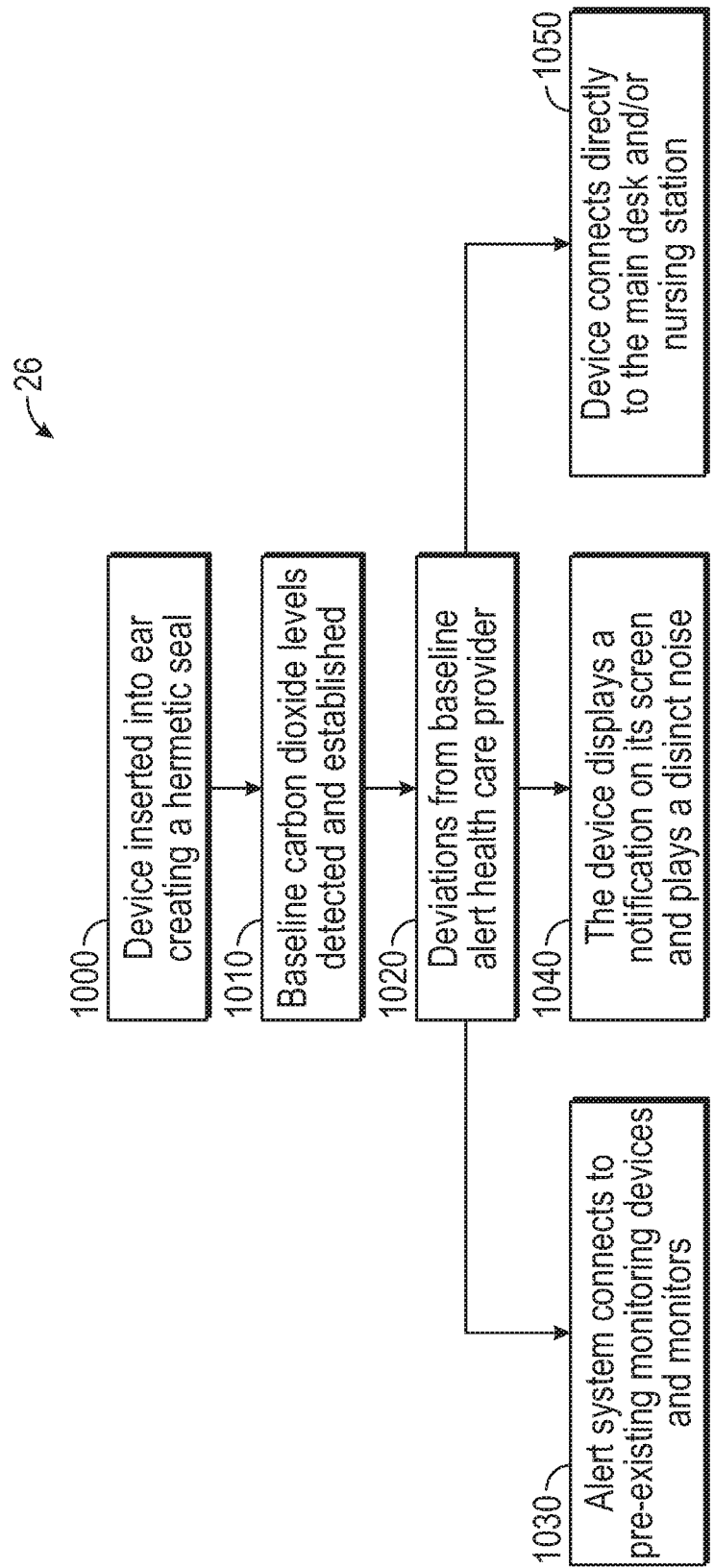
FIG. 8 is a process flow diagram showing an exemplary embodiment of an alert system in accordance with the present disclosure.

In exemplary embodiments, an alert system 26 is provided to inform others of significant ventilatory changes detected by the monitoring device and system. As discussed above, the carbon dioxide sensor monitors for altered carbon dioxide production and ventilatory impairment. The pressure sensor 21 and potential additional monitoring means supplement these measurements. The alert system 26 is adjustable to allow for warnings and alerts that can be tailored to each individual user's condition and preferences. For example, the alert system 26 may provide alerts in the event of altered carbon dioxide production or ventilatory impairment. Exemplary alert system process flow is shown in FIG. 8.

In operation, the user, whether medical professional or patient, inserts the occlusive earpiece 14, 114, 214, 314, 414 in the ear at the proximal end of the external auditory canal 22 so the earpiece forms a hermetic seal with the auditory canal. The user may mold, shape, or inflate the occlusive earpiece 14, 114, 214, 314, 414 as needed to form the seal. Also, if necessary, the user may employ an external stability mechanism such as stability hook 17 to wrap around the ear and better attach the CO2 monitoring device 10, 110, 210, 310, 410 to the ear.

With the CO2 measuring device or system 10, 110, 210, 310, 410 operatively coupled to the user's ear, CO2 levels can now be monitored. Device or system 10, 110, 210, 310, 410 specifically the carbon dioxide sensor 16, 116, 216, 316, measures arterial carbon dioxide levels in arterial blood vessels of a patient's tympanic membrane 19 and external auditory canal 22. The carbon dioxide sensor 16, 116, 216, 316 will measure carbon dioxide levels from different locations, as discussed above. It may be positioned within the housing 12, at a proximal end of earpiece 114, within diffusible membrane 218 partially inserted into the auditory canal 22, or in occlusive earpiece 314 positioned so it is directly exposed to the closed environment of the auditory canal 22. In addition to or instead of sensing CO2 with a carbon dioxide sensor, pressure differences, which may reflect and correlate with changes in arterial CO2 levels, are monitored by pressure sensor 21.

The user can use the device's LCD screen 13 or other display to view the CO2 levels data and buttons 15 to adjust the settings and access various features of the system. The lock-unlock feature may be used to prevent accidental, unintended pressing of the buttons. The user can also program the alert system so it will inform him or her of significant ventilatory changes such as altered carbon dioxide production or ventilatory impairment. As shown in FIG. 8, the alert system 26 can be adjusted to allow for warnings and alerts tailored to the user's condition and preferences. After the device is inserted into the ear creating a hermetic seal (1000) and baseline carbon dioxide levels detected and established (1010), deviations from the baseline alert the health care provider (1020). The alert system then connects to pre-existing monitoring devices and monitors (1030), the device displays a notification on its screen and plays a distinct noise (1040) and connects directly to the main desk or nursing station (1050).

Thus, it is seen that systems and devices for monitoring and measuring arterial carbon dioxide are provided. It should be understood that any of the foregoing configurations and specialized components or chemical compounds may be interchangeably used with any of the systems of the preceding embodiments. Although illustrative embodiments of the present invention are described hereinabove, it will be evident to one skilled in the art that various changes and modifications may be made therein without departing from the invention. It is intended in the appended claims to cover all such changes and modifications that fall within the true spirit and scope of the invention.

What is claimed is:

1. An arterial carbon dioxide monitoring device, comprising:
   a housing;
   an earpiece coupled to the housing, the earpiece being configured to provide a hermetic seal enclosing a patient's external auditory canal; and
   a carbon dioxide sensor located within the housing for measuring arterial carbon dioxide levels in arterial blood vessels of the patient's tympanic membrane and external auditory canal;
   wherein the hermetic seal is configured to create equilibration between airspace contained in the external auditory canal and the arterial blood vessels.

2. The device of claim 1 wherein the carbon dioxide sensor measures arterial carbon dioxide levels by measuring changes in carbon dioxide diffusion from the arterial blood vessels of the tympanic membrane and external auditory canal.

3. The device of claim 2 wherein the carbon dioxide sensor quantifies gas diffusion through the tympanic membrane and the external auditory canal.

4. The device of claim 1 wherein the carbon dioxide sensor monitors for altered carbon dioxide production and ventilatory impairment.

5. The device of claim 4 further comprising an alert system providing alerts in an event of the altered carbon dioxide production or ventilatory impairment.

6. The device of claim 1 further comprising a user display including one or more buttons.

7. The device of claim 6 further comprising a lock-unlock feature to prevent accidental pressing of the one or more buttons.

8. The device of claim 1 further comprising a pressure sensor located within the housing, the pressure sensor measuring pressure changes in the patient's ear.

9. The device of claim 1 further comprising a stability hook coupled to the earpiece to allow the device to be stably attached to the patient's ear.

10. The device of claim 1 wherein the earpiece defines a tube running therethrough.

11. A system for measuring arterial carbon dioxide levels, comprising:
    an occlusive earpiece having a proximal end and a distal end and being configured to provide a hermetic seal enclosing a patient's external auditory canal; and
    a carbon dioxide sensor for measuring arterial carbon dioxide levels in arterial blood vessels of the patient's tympanic membrane and external auditory canal;
    wherein the hermetic seal is configured to create equilibration between airspace contained in the external auditory canal and the arterial blood vessels.

12. The system of claim 11 wherein the occlusive earpiece defines a tube running therethrough.

13. The system of claim 11 wherein the carbon dioxide sensor is located at or near the proximal end of the occlusive earpiece.

14. The system of claim 11 wherein the carbon dioxide sensor is located at or near the distal end of the occlusive earpiece and is configured to be directly exposed to the auditory canal.

15. The system of claim 12 wherein the occlusive earpiece has a diffusible membrane that allows diffusion of carbon dioxide into the tube and the carbon dioxide sensor is located in the diffusible membrane.

16. The system of claim 11 further comprising a pressure sensor measuring pressure changes in the patient's ear.

17. The system of claim 11 wherein the carbon dioxide sensor measures arterial carbon dioxide levels by measuring changes in carbon dioxide diffusion from the arterial blood vessels of the tympanic membrane and external auditory canal.

18. The system of claim 17 further comprising a housing coupled to the occlusive earpiece.

19. The system of claim 11 wherein the carbon dioxide sensor monitors for the altered carbon dioxide production and ventilatory impairment and further comprises an alert system providing alerts in an event of altered carbon dioxide production or ventilatory impairment.

20. The system of claim 11 further comprising a stability hook coupled to the occlusive earpiece to allow the occlusive earpiece to be stably attached to the patient's ear.

21. The device of claim 10 wherein the carbon dioxide sensor measures carbon dioxide within the tube.

22. The device of claim 10 wherein the earpiece has a diffusible membrane that allows diffusion of carbon dioxide into the tube and the carbon dioxide sensor is located in the diffusible membrane.

23. The system of claim 12 wherein the carbon dioxide sensor measures carbon dioxide within the tube.

* * * * *